US012626527B2

(12) United States Patent
Lellouche et al.

(10) Patent No.: US 12,626,527 B2
(45) Date of Patent: May 12, 2026

(54) AUTOMATIC DOCUMENT TEMPLATE INFERENCE, GENERATION, AND REFINEMENT

(71) Applicant: Sage Global Services Limited, Newcastle-Upon-Tyne (GB)

(72) Inventors: Gal Isaac Lellouche, Tel Aviv (IL); Saed Hussain, London (GB); Ernest Ho Hin Chow, London (GB); Alexander Millar, London (GB)

(73) Assignee: Sage Global Services Limited, Newcastle-upon-Tyne (GB)

( * ) Notice: Subject to any disclaimer, the term of this patent is extended or adjusted under 35 U.S.C. 154(b) by 239 days.

(21) Appl. No.: 18/367,925

(22) Filed: Sep. 13, 2023

(65) Prior Publication Data

US 2025/0087010 A1      Mar. 13, 2025

(51) Int. Cl.
*G06V 30/414*          (2022.01)
*G06V 30/19*            (2022.01)

(52) U.S. Cl.
CPC ...... *G06V 30/414* (2022.01); *G06V 30/19133* (2022.01); *G06V 30/1914* (2022.01)

(58) Field of Classification Search
CPC ............. G06V 30/414; G06V 30/1914; G06V 30/19133; G06V 10/40; G06V 10/751; G06Q 30/04
See application file for complete search history.

(56) References Cited

U.S. PATENT DOCUMENTS

| | | |
|---|---|---|
| 9,740,368 B1 | 8/2017 | Love et al. |
| 10,769,503 B1 | 9/2020 | Buhler et al. |
| 11,580,763 B2 | 2/2023 | Ammar et al. |
| 12,243,082 B1 * | 3/2025 | Stifter .................... G06N 20/00 |
| 2002/0029232 A1 | 3/2002 | Bobrow et al. |
| 2003/0110128 A1 * | 6/2003 | Foth ........................ G06Q 20/14 |
| | | 705/40 |
| 2005/0100219 A1 | 5/2005 | Berkner et al. |
| 2010/0027895 A1 | 2/2010 | Noguchi et al. |
| 2010/0070507 A1 | 3/2010 | Mori |
| 2012/0070091 A1 | 3/2012 | Saund |
| 2016/0034821 A1 | 2/2016 | Konoshima et al. |
| 2017/0068866 A1 | 3/2017 | Kostyukov |
| 2017/0132866 A1 | 5/2017 | Kuklinski et al. |

(Continued)

FOREIGN PATENT DOCUMENTS

EP          3955130 A1 *   2/2022    ........... G06F 18/231

OTHER PUBLICATIONS

Palm, Rasmus Berg et al., "CloudScan—A configuration-free invoice analysis system using recurrent neural networks", 2017 14th IAPR International Conference on Document Analysis and Recognition, pp. 406-413.

(Continued)

*Primary Examiner* — Daniel G Mariam

(74) *Attorney, Agent, or Firm* — Raubvogel Law Office

(57)          ABSTRACT

Various embodiments offer improved functionality for generating and/or refining templates that can be used for automatically extracting information from within an invoice or other document, based on geometric characteristics of the document. An initial template may be automatically generated, and such initial template may then be refined over time based on user feedback, so as to improve reliability and accuracy in information extraction.

27 Claims, 6 Drawing Sheets

(56) References Cited

U.S. PATENT DOCUMENTS

| | | | |
|---|---|---|---|
| 2019/0095968 A1* | 3/2019 | Ceribelli | ........... G06Q 50/01 |
| 2019/0294874 A1 | 9/2019 | Orlov et al. | |
| 2020/0065576 A1 | 2/2020 | Padmanaban et al. | |
| 2020/0193552 A1 | 6/2020 | Turkelson et al. | |
| 2020/0302016 A1 | 9/2020 | Aggarwal et al. | |
| 2021/0004589 A1 | 1/2021 | Turkelson et al. | |
| 2021/0240975 A1 | 8/2021 | Sundell et al. | |
| 2022/0067365 A1 | 3/2022 | Agrawal et al. | |
| 2022/0156300 A1 | 5/2022 | Paruchuri et al. | |
| 2022/0327851 A1 | 10/2022 | Flagg et al. | |
| 2023/0028992 A1 | 1/2023 | Zagaynov et al. | |
| 2023/0125696 A1 | 4/2023 | Khamkar et al. | |
| 2023/0138491 A1 | 5/2023 | Semenov | |
| 2023/0206670 A1 | 6/2023 | Cui et al. | |
| 2023/0230408 A1 | 7/2023 | Arroyo et al. | |
| 2023/0245485 A1 | 8/2023 | Rimchala et al. | |
| 2024/0414151 A1* | 12/2024 | Borshevsky | ......... G06V 30/412 |

OTHER PUBLICATIONS

Rusinol, Marcal et al., "Field Extraction from Administrative Documents by Incremental Structural Templates", 2013 12th International Conference on Document Analysis and Recognition, pp. 1100-1104.

Sun, Yingyi et al., "Template Matching-Based Method for Intelligent Invoice Information Identification", IEEE Access, 2019, pp. 28392-28401.

Neelakantan, Arvind et al., "Text and Code Embeddings by Contrastive Pre-Training", Jan. 24, 2022, 13 pages.

Dua, Sumit, "Text Classification using K Nearest Neighbors", Towards Data Science, Nov. 13, 2018, 17 pages.

Panagopoulos, Dimitris, "Detecting Credit Card Fraud with Autoencoders in Python", Towards Data Science, Apr. 18, 2020, 15 pages.

Shakya, Ashin, "Text Classification: Using K Nearest Neighbors", May 15, 2020, 12 pages.

* cited by examiner

AUTOMATIC DOCUMENT TEMPLATE INFERENCE, GENERATION, AND REFINEMENT

CROSS-REFERENCE TO RELATED APPLICATION

The present application is related to U.S. Utility application Ser. No. 17/939,809 for "Classifying Documents Using Geometric Information", filed Sep. 7, 2022, which is incorporated by reference herein in its entirety.

TECHNICAL FIELD

The present document relates to techniques for automatically extracting information from documents.

BACKGROUND

An important component of software applications such as accounting applications is the extraction of information from documents that arrive from external sources, such as invoices, statements, and/or the like.

Conventionally, when invoices and/or other documents arrive at a company, information from such documents must be entered into accounting software for payment and/or other processing. Such operations may take place by manual entry, or by optical character recognition of text contained in the incoming invoices and/or other documents. Such manual operations can be tedious, time-consuming, and error prone.

More specifically, in the context of accounting software, reliable extraction of information from incoming documents is critical so as to ensure that transactions are correctly encoded and recorded in a general ledger. In general, existing optical character recognition (OCR) technology does a poor job of extracting information from documents such as vendor invoices, and often results in errors.

In addition, conventional deep learning based tools often require large volumes of annotated training data before they are able to deliver adequate performance in reliably extracting information from documents.

In addition, because of the expensive and long training times, conventional systems provide models that are focused on zero-shot prediction, to provide best results on average without improving over time.

SUMMARY

Various embodiments described herein offer improved functionality for generating and/or refining templates that can be used for automatically extracting information from an invoice or other document, based on geometric characteristics of the document. An initial template may be automatically generated, and such initial template may then be refined and improved over time based on user interactions and feedback, so as to improve reliability and accuracy in information extraction.

As described in the above-referenced related application, many vendors use a standard document template for invoices and/or other documents that may be generated by their accounting software or other source. Often, each vendor's standard document template has some geometric characteristics that are unique to that vendor. According to the techniques described in the above-referenced related application, geometric information extracted from incoming images of documents can be used to construct a unique vendor template, thereby providing a mechanism for automatically identifying particular vendors when new documents are received. Such techniques can be used for classifying any type of document.

The vendor template specifies where key information may be found within each document. Such key information (referred to herein as "entities") may include, for example: vendor name, invoice number, document number, due date, and/or the like.

According to various embodiments described herein, vendor templates may be automatically determined so that entity location information from such templates may be used to automatically extract data from documents in a reliable and accurate manner. A software application is used to automatically determine the locations of a document's entities and to generate a template for the document; little to no human intervention is needed.

In at least one embodiment, when a document is first encountered, the system examines the document, identifies the entities and their location in the document, and stores this information in a template file. If there is user feedback, the template may be automatically updated based on such feedback, so as to provide a mechanism to automatically improve accuracy and confidence in the template.

When a document from the same template is encountered in the future, the stored template may be retrieved and used to extract entities from the new document. In at least one embodiment, a given template can be used across users who may receive invoices from the same vendor.

In at least one embodiment, the system operates in real time (i.e., during a user interaction session). The template may be automatically generated from a single file with no human intervention, and may be updated continually, based on received user feedback and/or other information.

The described system is thus able to automatically generate a document template, in real time, during user interaction, with no human intervention. Temples may be automatically and continually updated based on user feedback, so as to further increase accuracy and confidence. Document templates can be used to reliability and accurately extract entities as needed to obtain information from received documents.

In at least one embodiment, if an edge case is detected wherein the system is unable to automatically generate an optimized template, such a case may be flagged so that a human can be prompted to provide information and/or improve the template.

Further details and variations are described herein.

BRIEF DESCRIPTION OF THE DRAWINGS

The accompanying drawings, together with the description, illustrate several embodiments. One skilled in the art will recognize that the particular embodiments illustrated in the drawings are merely exemplary, and are not intended to limit scope.

DETAILED DESCRIPTION OF THE EMBODIMENTS

Figure 1:
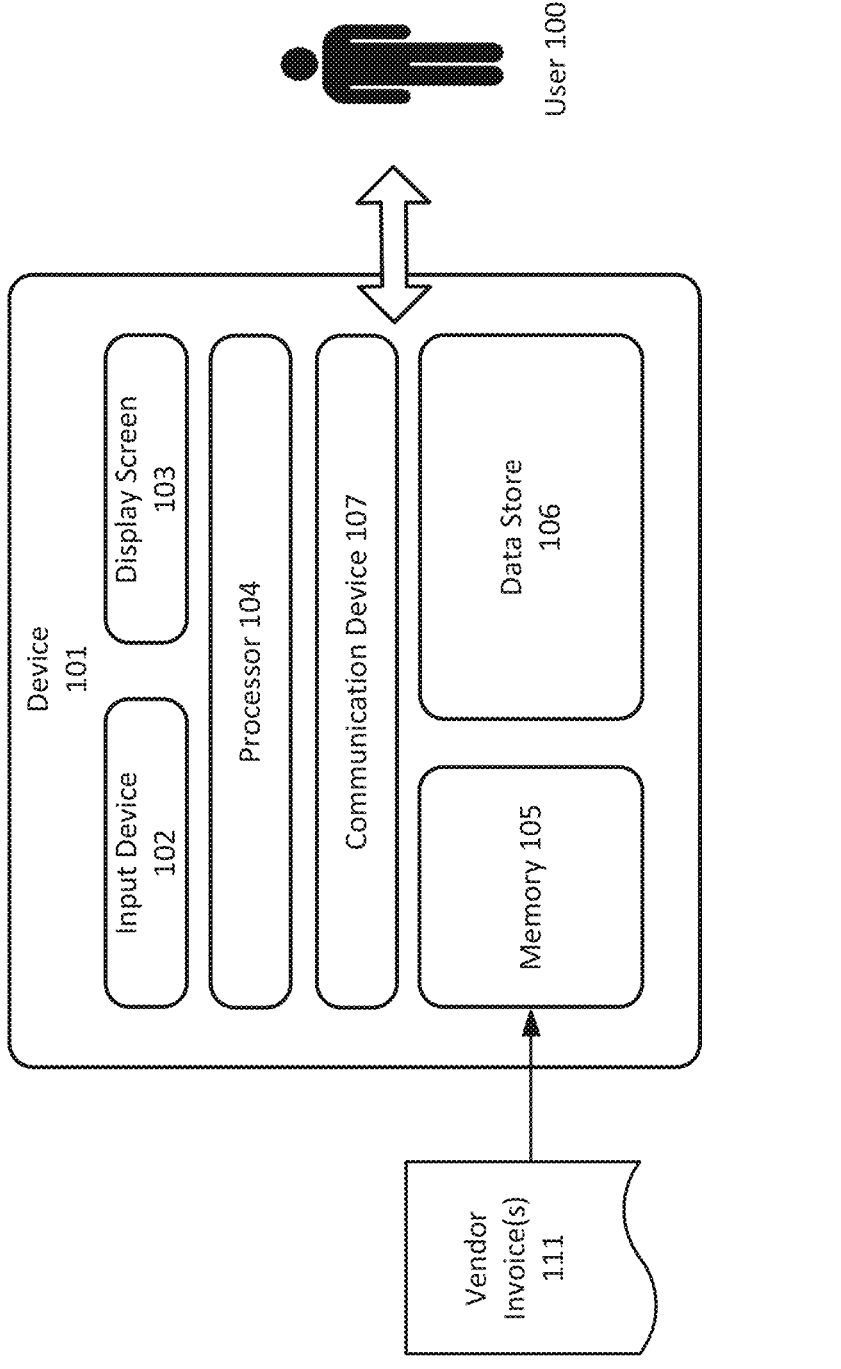
FIG. 1 is a block diagram depicting a hardware architecture for implementing the techniques described herein according to one embodiment.

The systems and methods set forth herein may be applied in many contexts in which it can be useful to extract information from documents, such as for example invoices received from vendors. Such techniques can be useful in efforts to automate financial and accounting processes, since many financial transactions use documents. Accordingly, one context for the techniques presented herein is to assist in automating a process of extracting information from documents for such financial or accounting processes.

In various embodiments, the techniques described herein can be implemented in cloud-based accounting software, for example, to generate and refine templates for automatically extracting information from an incoming invoice or other document. Once the relevant information has been extracted, the system can apply related rules and business logic to receive and process the information. In addition, automated extraction of information from incoming documents can improve efficiency as well as overall results and accuracy of the accounting system.

The described techniques can also be used in other contexts, and are not limited to extracting information from documents such as invoices. For example, the described techniques can be applied to generate and refine templates for extraction of information from any type of documents for any purpose, and one skilled in the art will recognize that the described techniques can be used in many other situations as well. In addition, the particular hardware arrangements depicted and described herein are simplified examples for illustrative purposes.

In some embodiments, one or more components, as shown and described below in connection with FIGS. 1 and 2, may be used to implement the system and method described herein. In at least one embodiment, such components may be implemented in a cloud computing-based client/server architecture, using, for example, Amazon Web Services, an on-demand cloud computing platform available from Amazon.com, Inc. of Seattle, Washington. Therefore, for illustrative purposes, the system and method are described herein in the context of such an architecture. One skilled in the art will recognize, however, that the systems and methods described herein can be implemented using other architectures, such as for example a standalone computing device rather than a client/server architecture.

Further, the functions and/or method steps set forth herein may be carried out by software running on one or more of the device 101, client device(s) 108, server 110, and/or other components. This software may optionally be multi-function software that is used to retrieve, store, manipulate, and/or otherwise use data stored in data storage devices such as data store 106, and/or to carry out one or more other functions.

Definitions and Concepts

For purposes of the description herein, a "user", such as user 100 referenced herein, may be an individual, company, business, organization, enterprise, group, or the like, which may optionally include one or more individuals. In the context of the description herein, such individual, company, business, organization, enterprise, group, or the like may also be referred to as a "customer".

A "data store", such as data store 106 referenced herein, may be any device capable of digital data storage, including any known hardware for nonvolatile and/or volatile data storage. A collection of data stores 106 may form a "data storage system" that can be accessed by multiple users.

A "computing device", such as device 101 and/or client device(s) 108, may be any device capable of digital data processing.

A "server", such as server 110, may be a computing device that provides data storage, either via a local data store, or via connection to a remote data store.

A "client device", such as client device 108, may be an electronic device that communicates with a server, provides output to a user, and accepts input from a user.

An "agent" may be a software module to perform a particular function or group of functions. An agent may include one or more software procedure(s), statistical and/or probability-based algorithm(s), machine learning model(s), and/or the like.

A "document", such as vendor invoice 111, may be any electronic or paper document, or an image representing such a document, which may include text and/or numeric information, and which may (but need not) pertain to accounting or business transactions. Examples include invoices, receipts, and/or other financial paperwork.

An "entity" may be an item of information that may be found within a document, such as for example a document date, invoice date, company name, due date, total amount, total tax, and/or the like.

For purposes of the description herein, the functionality will be set forth in terms of generating and refining templates for extracting of information from invoices received from vendors. However, such embodiments are merely exemplary; the techniques described herein may be implemented in connection with other documents received from other sources, and the descriptions set forth herein should be considered to apply to any such alternative embodiments and contexts.

System Architecture

According to various embodiments, the systems and methods described herein can be implemented on any electronic device or set of interconnected electronic devices, each equipped to receive, store, and present information. Each electronic device may be, for example, a server, desktop computer, laptop computer, smartphone, tablet computer, and/or the like. As described herein, some devices used in connection with the systems and methods described herein are designated as client devices, which are generally operated by end users. Other devices are designated as servers, which generally conduct back-end operations and communicate with client devices (and/or with other servers) via a communications network such as the Internet. In at least one embodiment, the techniques described herein can be implemented in a cloud computing environment using techniques that are known to those of skill in the art.

In addition, one skilled in the art will recognize that the techniques described herein can be implemented in other contexts, and indeed in any suitable device, set of devices, or system capable of interfacing with existing enterprise data storage systems. Accordingly, the following description is intended to illustrate various embodiments by way of example, rather than to limit scope.

Referring now to FIG. 1, there is shown a block diagram depicting a hardware architecture for practicing the described system, according to one embodiment. Such an architecture can be used, for example, for implementing the techniques of the system in a computer or other device 101. Device 101 may be any electronic device.

In at least one embodiment, device 101 includes a number of hardware components that are well known to those skilled in the art. Input device 102 can be any element that receives input from user 100, including, for example, a keyboard, mouse, stylus, touch-sensitive screen (touchscreen), touch-pad, trackball, accelerometer, microphone, or the like. Input can be provided via any suitable mode, including for example, one or more of: pointing, tapping, typing, dragging, and/or speech. In at least one embodiment, input device 102 can be omitted or functionally combined with one or more other components.

Data store 106 can be any magnetic, optical, or electronic storage device for data in digital form; examples include flash memory, magnetic hard drive, CD-ROM, DVD-ROM, or the like. In at least one embodiment, data store 106 stores information that can be utilized and/or displayed according to the techniques described below. Data store 106 may be implemented in a database or using any other suitable arrangement. In another embodiment, data store 106 can be stored elsewhere, and data from data store 106 can be retrieved by device 101 when needed for processing and/or presentation to user 100. Data store 106 may store one or more data sets, which may be used for a variety of purposes and may include a wide variety of files, metadata, and/or other data.

In at least one embodiment, data store 106 may store data such as vendor invoices 111 and/or other documents received from vendors, companies, and/or the like. Data store 106 may also store data extracted from vendor invoices 111, including entities and/or other data, for use as described herein in extracting information from invoices 111.

In at least one embodiment, such data can be stored at another location, remote from device 101, and device 101 can access such data over a network, via any suitable communications protocol.

In at least one embodiment, data store 106 may be organized in a file system, using well known storage architectures and data structures, such as relational databases. Examples include Oracle, MySQL, and PostgreSQL. Appropriate indexing can be provided to associate data elements in data store 106 with each other. Metadata associated with configuration data, and defining configuration templates and layers, can be stored in such databases using any suitable data format(s). In at least one embodiment, data store 106 may be implemented using cloud-based storage architectures such as NetApp (available from NetApp, Inc. of Sunnyvale, California) and/or Google Drive (available from Google, Inc. of Mountain View, California).

Data store 106 can be local or remote with respect to the other components of device 101. In at least one embodiment, device 101 may be configured to retrieve data from a remote data storage device when needed. Such communication between device 101 and other components can take place wirelessly, by Ethernet connection, via a computing network such as the Internet, via a cellular network, or by any other appropriate communication systems.

In at least one embodiment, data store 106 may be detachable in the form of a CD-ROM, DVD, flash drive, USB hard drive, or the like. Information can be entered from a source outside of device 101 into a data store 106 that may be detachable, and later displayed after the data store 106 is connected to device 101. In another embodiment, data store 106 may be fixed within device 101.

In at least one embodiment, data store 106 may be organized into one or more well-ordered data sets, with one or more data entries in each set. Data store 106, however, can have any suitable structure. Accordingly, the particular organization of data store 106 need not resemble the form in which information from data store 106 is displayed to user 100 on display screen 103. In at least one embodiment, an identifying label may also be stored along with each data entry, to be displayed along with each data entry.

Display screen 103 can be any element that displays information such as text and/or graphical elements. In particular, display screen 103 may present a user interface for importing vendor invoices 111, for configuring the automatic generation and refinement of templates for extracting information from vendor invoices 111, for viewing the output and results of such information extraction, and for prompting user 100 for feedback that may be provided via input device 102. In at least one embodiment where only some of the desired output is presented at a time, a dynamic control, such as a scrolling mechanism, may be available via input device 102 to change which information is currently displayed, and/or to alter the manner in which the information is displayed.

Processor 104 can be a conventional microprocessor for performing operations on data under the direction of software, according to well-known techniques. Memory 105 can be random-access memory, having a structure and architecture as are known in the art, for use by processor 104 in the course of running software.

Communication device 107 may communicate with other computing devices through the use of any known wired and/or wireless protocol(s). For example, communication device 107 may be a network interface card ("NIC") capable of Ethernet communications and/or a wireless networking card capable of communicating wirelessly over any of the 802.11 standards. Communication device 107 may be capable of transmitting and/or receiving signals to transfer data and/or initiate various processes within and/or outside device 101.

Figure 2:
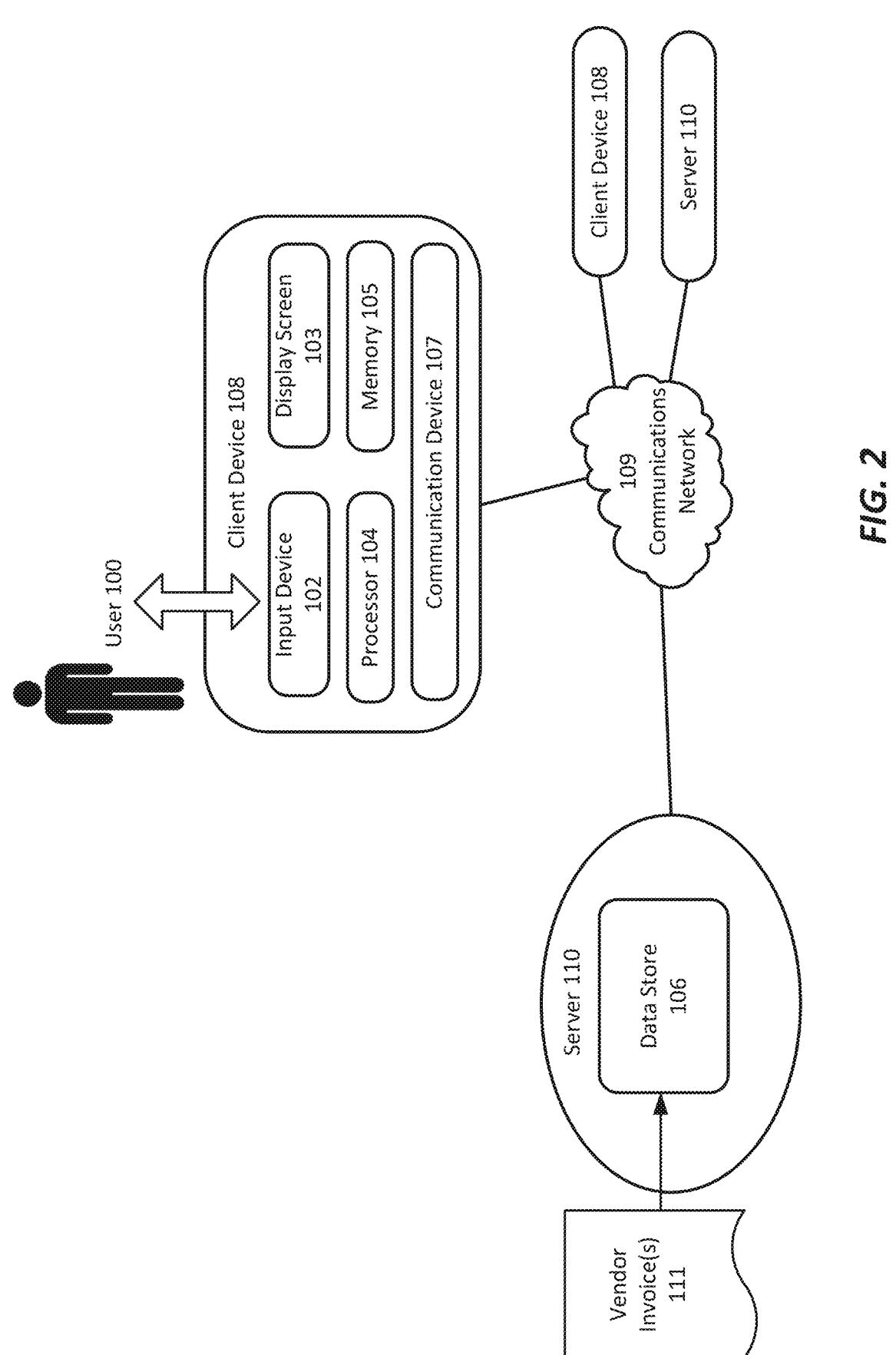
FIG. 2 is a block diagram depicting a hardware architecture for implementing the techniques described herein in a client/server environment, according to one embodiment.

Referring now to FIG. 2, there is shown a block diagram depicting a hardware architecture in a client/server environment, according to one embodiment. Such an implementation may use a "black box" approach, whereby data storage and processing are done completely independently from user input/output. An example of such a client/server environment is a web-based implementation, wherein client device 108 runs a browser that provides a user interface for interacting with web pages and/or other web-based resources from server 110. Items from data store 106 can be presented as part of such web pages and/or other web-based resources, using known protocols and languages such as Hypertext Markup Language (HTML), Java, JavaScript, and the like.

Client device 108 can be any electronic device incorporating input device 102 and/or display screen 103, such as a desktop computer, laptop computer, personal digital assistant (PDA), cellular telephone, smartphone, music player, handheld computer, tablet computer, kiosk, game system, wearable device, or the like. Any suitable type of communications network 109, such as the Internet, can be used as the mechanism for transmitting data between client device 108 and server 110, according to any suitable protocols and techniques. In addition to the Internet, other examples include cellular telephone networks, EDGE, 3G, 4G, 5G, long term evolution (LTE), Session Initiation Protocol (SIP), Short Message Peer-to-Peer protocol (SMPP), SS7, Wi-Fi, Bluetooth, ZigBee, Hypertext Transfer Protocol (HTTP), Secure Hypertext Transfer Protocol (SHTTP), Transmission Control Protocol/Internet Protocol (TCP/IP), and/or the like, and/or any combination thereof. In at least one embodiment, client device 108 transmits requests for data via communications network 109, and receives responses from server 110 containing the requested data. Such requests may be sent via HTTP as remote procedure calls or the like.

In one implementation, server 110 may be responsible for data storage and processing, and incorporates data store 106. Server 110 may include additional components as needed for retrieving data from data store 106 in response to requests from client device 108.

As described above in connection with FIG. 1, data store 106 may be organized into one or more well-ordered data sets, with one or more data entries in each set. Data store 106, however, can have any suitable structure, and may store data according to any organization system known in the information storage arts, such as databases and other suitable data storage structures. As in FIG. 1, data store 106 may store data such as vendor invoices 111 and/or other documents received from vendors, companies, and/or the like. In addition, data store 106 may also store data extracted from vendor invoices 111, for use as described herein; alternatively, such data can be stored elsewhere (such as at another server) and retrieved as needed.

In addition to or in the alternative to the foregoing, data may also be stored in a data store 106 that is part of client device 108. In some embodiments, such data may include elements distributed between server 110 and client device 108 and/or other computing devices in order to facilitate secure and/or effective communication between these computing devices.

As discussed above in connection with FIG. 1, display screen 103 can be any element that displays information such as text and/or graphical elements. Various user interface elements, dynamic controls, and/or the like may be used in connection with display screen 103.

As discussed above in connection with FIG. 1, processor 104 can be a conventional microprocessor for use in an electronic device to perform operations on data under the direction of software, according to well-known techniques. Memory 105 can be random-access memory, having a structure and architecture as are known in the art, for use by processor 104 in the course of running software. A communication device 107 may communicate with other computing devices through the use of any known wired and/or wireless protocol(s), as discussed above in connection with FIG. 1.

In one embodiment, some or all of the system can be implemented as software written in any suitable computer programming language, whether in a standalone or client/server architecture. Alternatively, it may be implemented and/or embedded in hardware.

Notably, multiple servers 110 and/or multiple client devices 108 may be networked together, and each may have a structure similar to those of client device 108 and server 110 that are illustrated in FIG. 2. The data structures and/or computing instructions used in the performance of methods described herein may be distributed among any number of client devices 108 and/or servers 110. As used herein, "system" may refer to any of the components, or any collection of components, from FIGS. 1 and/or 2, and may include additional components not specifically described in connection with FIGS. 1 and 2.

In some embodiments, data within data store 106 may be distributed among multiple physical servers. Thus, data store 106 may represent one or more physical storage locations, which may communicate with each other via the communications network and/or one or more other networks (not shown). In addition, server 110 as depicted in FIG. 2 may represent one or more physical servers, which may communicate with each other via communications network 109 and/or one or more other networks (not shown).

In one embodiment, some or all components of the system can be implemented in software written in any suitable computer programming language, whether in a standalone or client/server architecture. Alternatively, some or all components may be implemented and/or embedded in hardware.

Software Architecture

Figure 6:
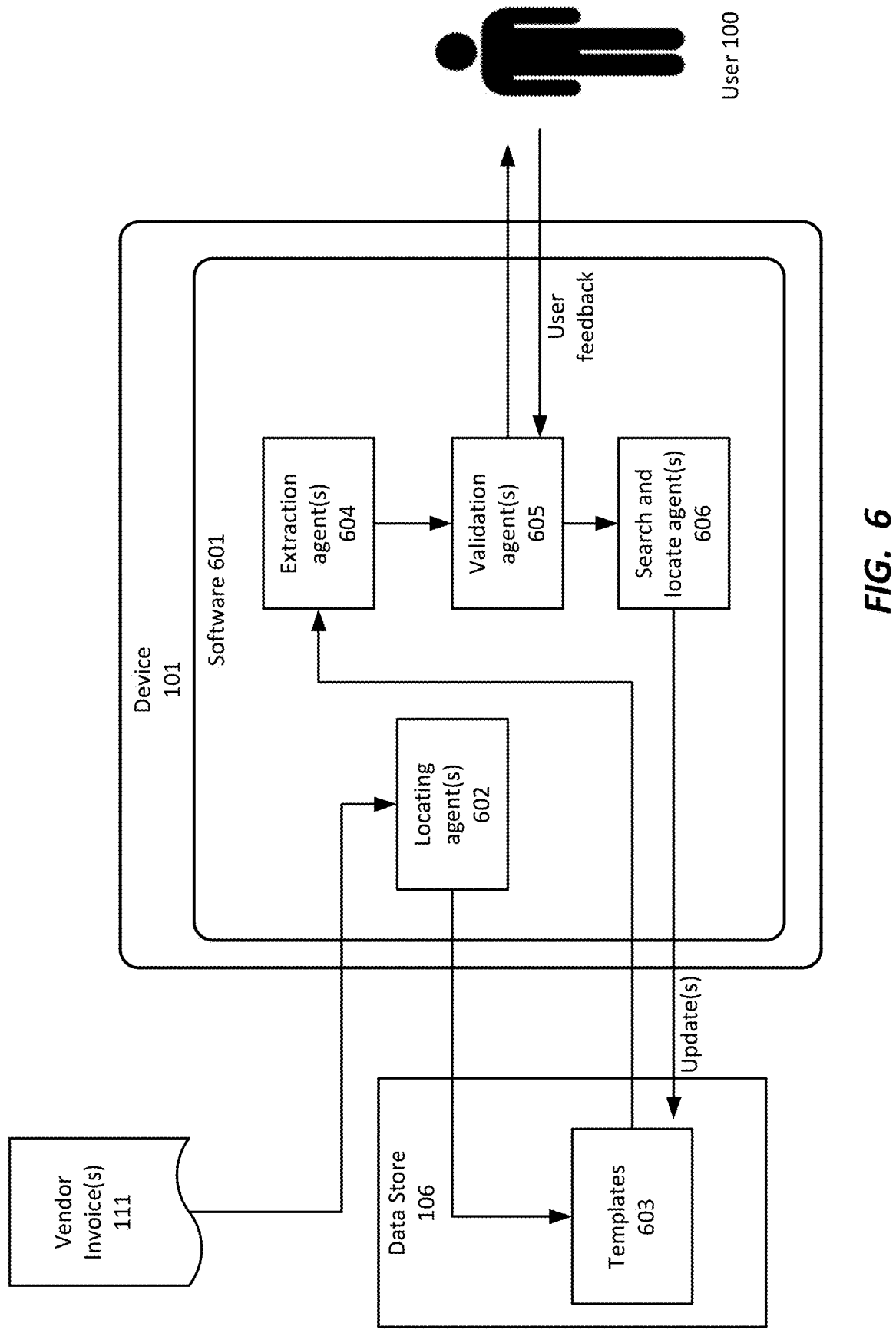
FIG. 6 is a block diagram depicting a software architecture for implementing the techniques described herein according to one embodiment.

Referring now to FIG. 6, there is shown a block diagram depicting a software architecture for implementing the techniques described herein according to one embodiment. In at least one embodiment, the software architecture shown in FIG. 6 may be implemented in a hardware architecture such as that shown in FIG. 1 or 2; alternatively, the software architecture shown in FIG. 6 may be implemented in any other suitable hardware architecture.

The software architecture shown in FIG. 6 includes various components and agents. One skilled in the art will recognize that the functionality described herein may be performed by such components and agents, and that such functionality may be distributed among such components and agents in any suitable manner. Thus, some of the components and agents may be omitted and/or combined or divided into other components as appropriate, while still performing the various steps and functions described herein. The particular division of software into the depicted components and agents, along with the particular naming of such components and agents, is intended to be exemplary of one possible implementation of the described system and method. In at least one embodiment, more than one of each type of agent may be provided, so as to allow parallel processing and greater efficiency in performing the operations described herein.

Software 601 may run on device 101 (and/or on client device 108 and/or server 110), and may include various components and agents as depicted.

Locating agent(s) 602 may be responsible for receiving vendor invoice(s) 111, locating entities within such invoices 111, and determining localization, formatting, and confidence information. A template may then be built based on this information, and stored in data store 106 as a template object 603. Templates 603 may include any relevant indicators to help locate important information within invoice(s) 111, such as formatting, bounding boxes, and/or the like.

Extraction agent(s) 604 may be responsible for extracting information from vendor invoices 111, using information from templates 603.

Validation agent(s) 605 may be responsible for validating information extracted by extraction agent(s) 604 before such information is output to user 100. Validation agent(s) 605 may also be responsible for validating user 100 feedback, and assigning a confidence metric to it, before it is used for updating templates 603.

Search and locate agent(s) 606 may be responsible for finding each value for which user 100 provided feedback, and extracting a bounding box and/or any other relevant information. Template 603 may then be updated with the extracted bounding box and/or other relevant information (such as formatting or the like).

Further details regarding the operation of agents 602, 604, 605 and 606 are provided herein.

Method

In at least one embodiment, the system may automatically extract information from a document using a template, such as a vendor template, that specifies where key information may be found within each document. Such key information (referred to herein as "entities") may include, for example: vendor name, invoice number, document number, due date, and/or the like.

An initial template may be created in real-time, based on an initial prediction as to entity locations within the document. Such initial prediction may be based on a generated model.

In at least one embodiment, once the initial template has been created, the system may use textual feedback obtained from users to refine its understanding of where entities may be found within a document, so as to improve the template. For example, rather than having users draw bounding boxes around entities, the system can obtain textual feedback from users that specifies data expected to the found within the document. As described in more detail herein, such feedback can be matched against data found within the document, along with locations within the document where such data is found, so as to refine the system's template and thereby improve accuracy. In at least one embodiment, the process may include cleaning the feedback, for example, by identifying which aspects of the feedback are trustworthy and which are not. The process may also include determining the correct location in the document that matches the provided textual input, so that such information can be used in creating and/or refining the template for the document. The template for the document may thus continue to improve, and to provide more accurate results.

In at least one embodiment, for example, a user may input feedback containing a text string. The system may then look for text fields and/or bounding boxes containing text matching the text string input by the user. The system may use this information to refine the template. This can be done, for example, by comparing output from the most recent version of the template with the feedback input from the user. The feedback input can be used to identify those regions of the template that most closely align with the input, so that the template can be refined.

In at least one embodiment, the user can correct any pre-populated text in order to train the model that is used to generate the template. Extraction can be used for the initial prediction, and can also be used in subsequent steps to determine whether the predicted output matches or conflicts with user feedback; such determination can then be used for further training and refinement of the template. In at least one embodiment, this process can be performed automatically and without any human in the loop.

Eventually, once the template becomes sufficiently accurate, user feedback may be rare or non-existent, and the stabilized version of the template then becomes highly effective for extracting data.

In at least one embodiment, prior to extracting information from a received document (such as an invoice), the system may perform an analysis of geometric features of the document. Such geometric analysis, when combined with text analysis such as term frequency-inverse document frequency (TF-IDF) and the like, can provide improved accuracy in identification and classification of the document, for example to determine a vendor associated with a document.

In at least one embodiment, such analysis may be performed according to techniques described in the above-referenced related application. In other embodiments, other techniques may be used for identifying and/or classifying the document, vendor, or source of the document.

Figure 3:
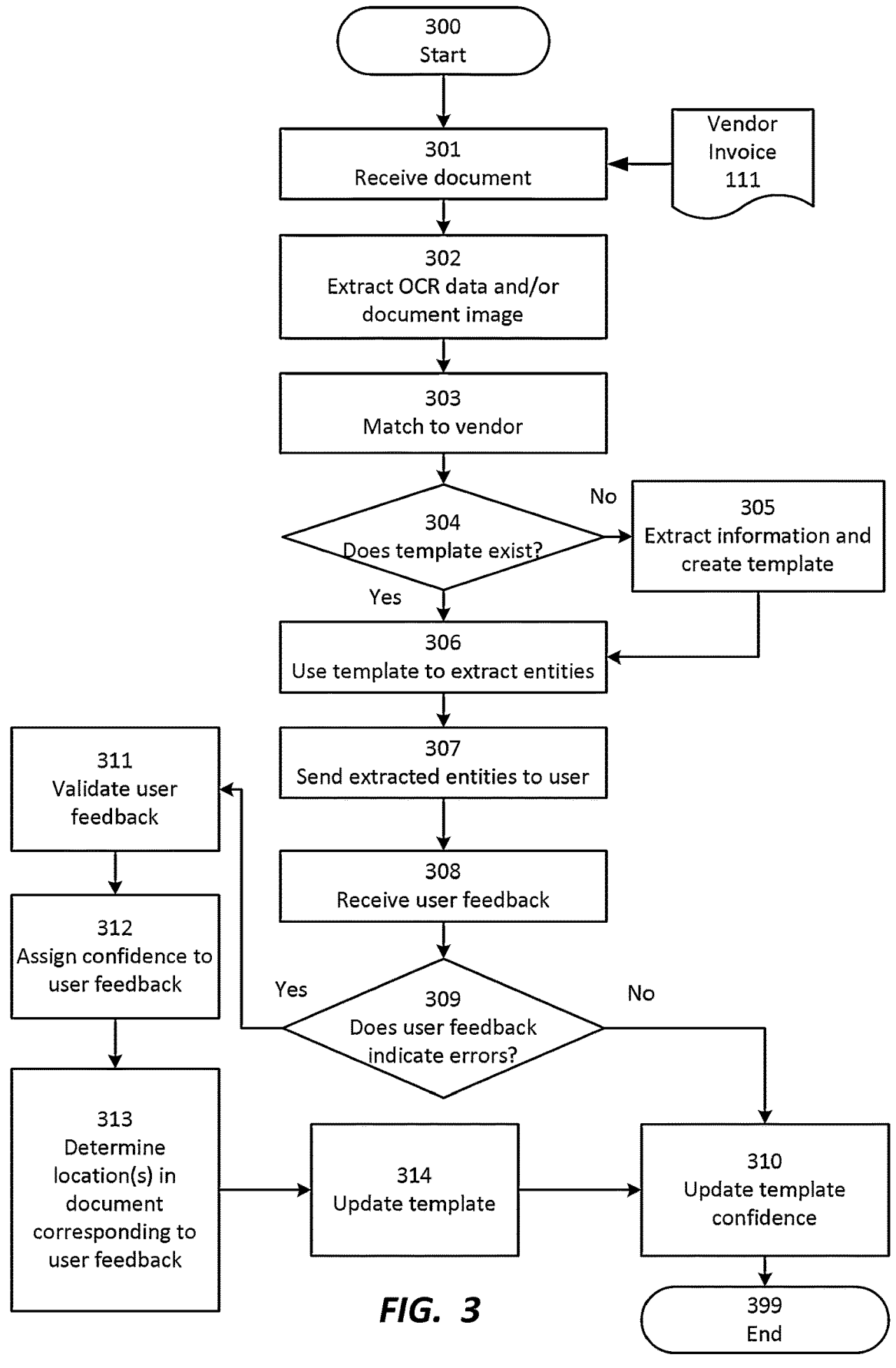
FIG. 3 is a flow diagram depicting a method for automatically extracting information from documents, according to one embodiment.

Referring now to FIG. 3, there is shown a flow diagram depicting an overall method for automatically extracting information from documents, according to one embodiment.

As mentioned above, the depicted method can be used for extracting information from any type of document(s) and/or from any source(s), and is not limited to extracting information from invoices received from vendors.

In at least one embodiment, the method of FIG. 3 may be performed by software running on a hardware architecture such as that described in connection with FIGS. 1 and/or 2; however, one skilled in the art will recognize that the method of FIG. 3 may be performed using any suitable hardware architecture.

The method begins 300. In a step 301, a document (such as vendor invoice 111) may be received. In a step 301, optical character recognition (OCR) data and/or a document image may be extracted from the document. If appropriate, further processing may be performed to interpret various text items and their locations within the document, as described in the above-referenced related application.

In a step 303, the document may be matched to a particular source, such as a particular vendor. In at least one embodiment, this may be done by comparing information extracted in step 302 to known data associated with a vendor, such as for example by comparing a vendor ID detected by OCR in step 302 with stored vendor records. Techniques described in the above-referenced related application may be used for accomplishing vendor matching in step 303.

Once the document has been matched to a particular source in step 303, such as a particular vendor, the system may, in a step 304, check whether a template exists for the identified source. In at least one embodiment, step 304 may be performed by checking in a database for a previously stored template associated with the identified source (for example, by searching for a vendor record having a vendor ID that matches that of the document).

If a template does not already exist, the system may create one, in a step 305. In at least one embodiment, step 305 may be performed by automatically attempting to locate entities within the document, and determining localization, formatting, and confidence information associated with the extracted entities. In at least one embodiment, one or more locating agent(s) 602 may be used to perform this step, wherein such locating agent(s) 602 may be software modules running within the context of the system described herein, as described in connection with FIG. 6.

Examples of locating agents include, but are not limited to:

one or more statistical models that may choose the best bounding box based on content, feedback and history;

one or more large language models (LLMs) that use similarity to identify the right box one or more regular expression (regex) algorithms to identify the value type; and/or one or more other algorithms that may be used to identify a unique type.

In at least one embodiment, such agents may be executed by the system after feedback is received; the agents may use their own local storage.

A template object 603 based on the entities, as well as the localization, formatting, and confidence information, may be generated and stored, for example in a database in data store 106. This initial template may not be entirely accurate, but it will be refined based on feedback received by users 100 in subsequent steps.

In a step 306, template 603 may be used to extract entities from the document. In a step 307, extracted entities may be sent to user 100. In at least one embodiment, step 306 may be performed by extraction agent(s) 604. In at least one embodiment, validation agent(s) 605 may be used for validating the extracted entities before they are sent to user 100. Any suitable means may be used for sending the extracted information to user 100, such as for example by generating output on display screen 103 of device 101 or client device 108.

In a step 308, the system may receive feedback from user 100 regarding the extracted entities. In a step 309, a determination may be made as to whether the user feedback indicates any errors in template 306. If not, the template confidence metric may be updated, in a step 310, and the method may end 399.

If, in step 309, the determination is made that the user feedback indicates any errors in template 306, the user feedback may be validated in a step 311, and a confidence metric may be assigned to the user feedback in a step 312. In at least one embodiment, the confidence metric may be determined based on the agent output on the previous prediction, optimized to be a used metric.

In at least one embodiment, validation agent(s) 605 may be used for validating the user feedback and/or for assigning a confidence metric to it.

In at least one embodiment, feedback is textual, so that user 100 is not required to draw bounding boxes around entities. Accordingly, assigning a confidence metric to the feedback in step 312 may include "cleaning" the feedback by determining whether the feedback is trustworthy, or, in some cases, which elements of the feedback are trustworthy and which are not.

Next, in a step 313, the system may search the document to determine which location(s) in the document correspond to the received feedback. For example, if user 100 provides feedback regarding an address field, the system may automatically determine the location of the address field within the document, so that the feedback can be applied to the correct location or field. This may include, for example, automatically determining a bounding box corresponding to the feedback value entered by user 100. In at least one embodiment, search and locate agent(s) 606 may perform this step, for example by scanning the document to determine such location(s).

In a step 314, the system may update template 603 according to the located feedback value in the document. This may include updating template 603 with the determined bounding box and any other relevant information associated with the feedback value entered by user 100. The template confidence metric may then be updated, in a step 310, and the method may end 399.

In at least one embodiment, steps 301 through 308 may be performed in real-time, such as during a user's interaction with the system.

Figure 5:
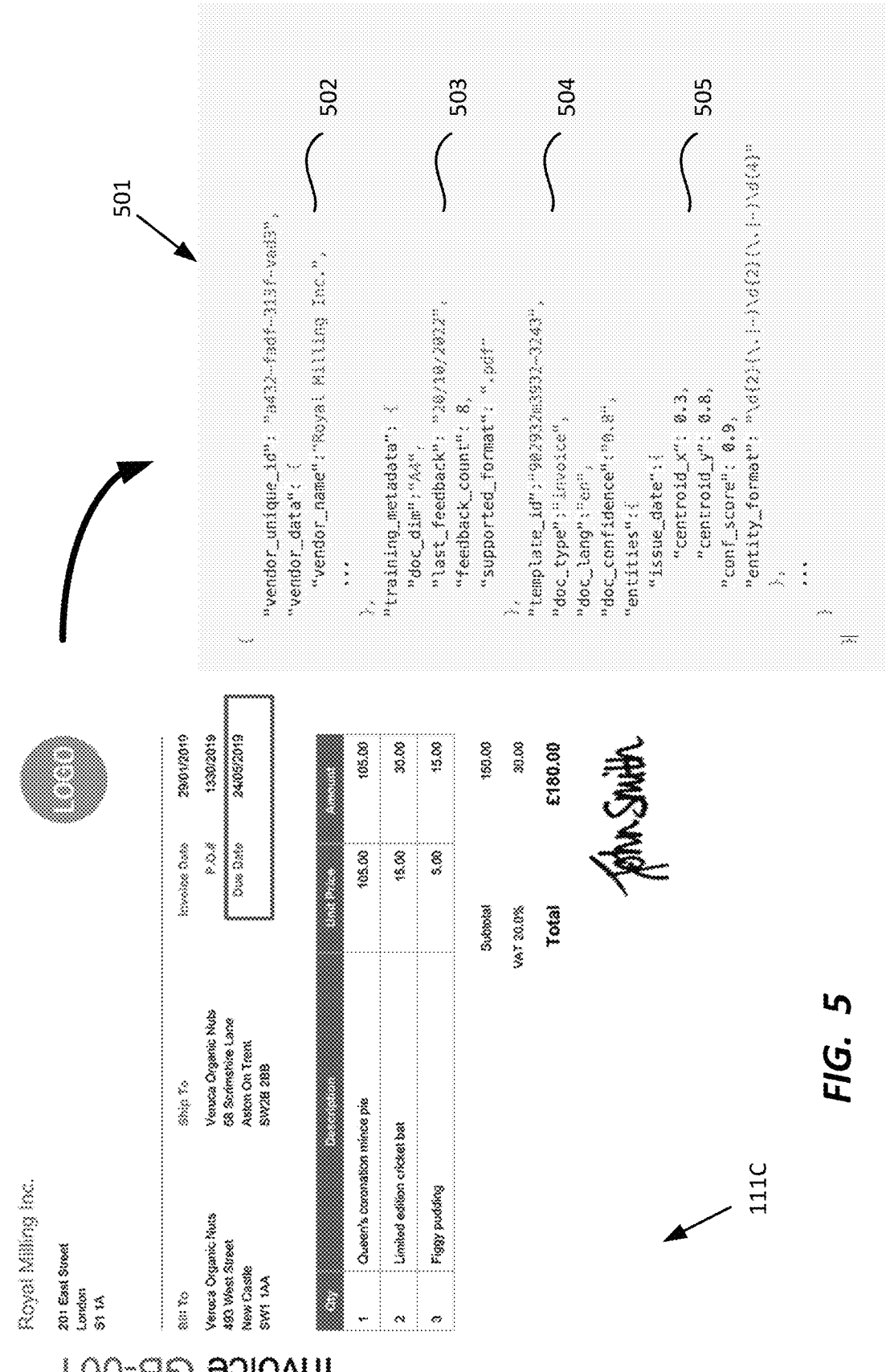
FIG. 5 depicts an example of a template that may be generated from a received invoice, according to one embodiment.

Referring now to FIG. 5, there is shown an example of a template portion 501 that may be generated from a received invoice 111C, according to one embodiment. As can be seen in this example, template portion 501 may include the following:

header 502, which may include a unique ID associated with a vendor (or other source), along with vendor data such as a name and/or the like;

training metadata 503, which may include information such as document dimensions, date of most recent feedback, number of times feedback has been received, supported document format, and/or the like; and body 504, which may include a template ID, document type, document language, confidence metric, and/or any number of entities 505.

In at least one embodiment, each entity 505 may include a title, centroid coordinates, confidence metric, entity format, and/or the like.

One skilled in the art will recognize that the format of template portion 501 depicted in FIG. 5 is merely an example, and that other formats may be used.

Training

Figure 4:
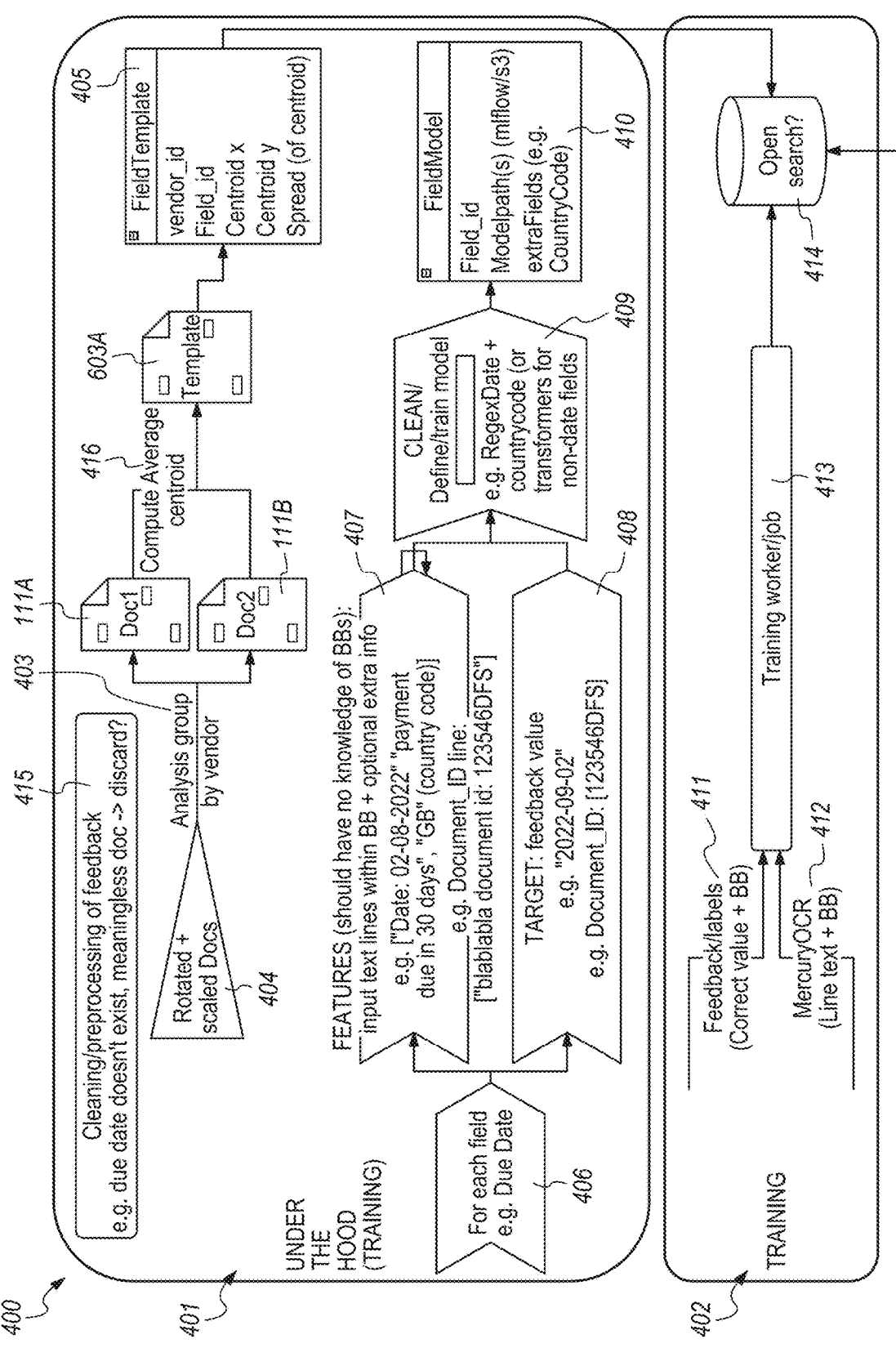
FIG. 4 is a flow diagram depicting a training method that may be used to generate and/or refine templates, according to one embodiment.

Referring now to FIG. 4, there is shown a flow diagram depicting a training method 400 that may be used to generate and/or refine templates 603, according to one embodiment.

In at least one embodiment, training method may include under the hood training 401 steps, and additional training 402 steps. As shown in FIG. 4, under the hood training 401 may include examples of agents, and additional training 402 may include the model that is used for refining/training the templates/agents.

In at least one embodiment, under the hood training 401 may include a step 415 wherein feedback from user 100 is cleaned and/or preprocessed. For example, if a user 100 provides feedback that includes invalid data, the feedback may be discarded.

Training may include receiving a number of documents, such as vendor invoices 111, that may be rotated and scaled for training purposes, resulting in rotated and scaled documents 404. In a step 403, these rotated and scaled documents 404 may be analyzed and grouped by vendor, resulting in documents 111A, 111B that indicate locations of entities within them. In a step 416, data from documents 111A, 111B may be aggregated, for example by computing an average centroid, so as to generate template 603A that indicates where various entities may be found within any given document (e.g., invoice 111) from that vendor. Record 405 depicts an example of one format for a template 603 as may be stored in a database in data store 106 or in some other location.

Additional details for generation of templates may be found, for example, in the above-referenced related application.

Steps 406 to 409 represent agent training. In a step 406, each field within each received document may be considered. A number of features 407 may be extracted from each document, and the system may receive feedback 408 regarding such features, for example from user 100.

In a step 409, the system may then be trained to transform features 407 to an expected format ("cleaning") so that they may be used for training.

For example, for a feedback on a date value, features 407 may be used as input to the agent and feedback 408 may represent the expected output. In this manner, input data may be cleaned, and a model may be defined/trained based on features 407 and target feedback values 408. The result is a field model 410 that may be stored in a database in data store 106 or in some other location. Based on a field type, the system may select a relevant agent and train it.

Additional training steps 402 may also be performed, including automatic template refining and building using the feedback and agents that were trained in step 406, so as to refine templates 603 and/or models 410. These steps 402 may include receiving feedback 411 from user 100 and OCR data 412. Training worker/job 413, which may be a software component, uses the received feedback 411 and OCR data 412 to refine templates 603 and/or models 410. In at least one embodiment, any suitable data store 414 may be the target of an open search for templates.

In at least one embodiment, the output of additional training steps 402 may be a template that may be saved in data store 414.

Advantages

In various embodiments, the described system and method may provide the following advantages over existing systems and methods:

Automated inference and generation: In at least one embodiment, the described system does not require a human to generate a template. The template may be generated and optimized automatically. Refinement of the template based on user feedback may be performed, as described above.

Automatic update: In at least one embodiment, the described system is able to automatically update a template based on format changes that may be present in received documents. No manual labeling or flagging is required to recognize and apply such changes. Rather, the described system is able to automatically identify when a format change has occurred, and to automatically update a template accordingly.

Vendor Knowledge Integration: In at least one embodiment, the described system is able to identify vendors across users based on a template. A document fingerprinting technique can be used to identify, as described in the above-referenced related application, allows the system to recognize that a vendor or document format has been previously encountered, even for a different user, so that the starting point for a document template for that vendor or document format can be more accurate and can incorporate feedback already received, even if such feedback was received from a different user. By using such an approach, the system can improve based on usage and across the ecosystem. For example, if user/entity X provides feedback on vendor1, then when user/entity Y interacts with vendor1, the system may use the same template including feedback formerly provided by user/entity X.

Improved Performance and Reduced Complexity: The techniques described herein can provide improved accuracy in extracting information from documents such as invoices, while reducing complexity and cost associated with such operations. Unlike deep learning models, the output may be provided in a transparent manner that can be easily understood and/or debugged by a human.

Real Time Operation: As described above, in at least one embodiment, the system is able to operate in real-time with minimal setup and initialization.

The present system and method have been described in particular detail with respect to possible embodiments. Those of skill in the art will appreciate that the system and method may be practiced in other embodiments. First, the particular naming of the components, capitalization of terms, the attributes, data structures, or any other programming or structural aspect is not mandatory or significant, and the mechanisms and/or features may have different names, formats, or protocols. Further, the system may be implemented via a combination of hardware and software, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference in the specification to "one embodiment" or to "an embodiment" means that a particular feature, structure, or characteristic described in connection with the embodiments is included in at least one embodiment. The appearances of the phrases "in one embodiment" or "in at least one embodiment" in various places in the specification are not necessarily all referring to the same embodiment.

Various embodiments may include any number of systems and/or methods for performing the above-described techniques, either singly or in any combination. Another embodiment includes a computer program product comprising a non-transitory computer-readable storage medium and computer program code, encoded on the medium, for causing a processor in a computing device or other electronic device to perform the above-described techniques.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It may be convenient at times, principally for reasons of common usage, to refer to these signals as bits, values, elements, symbols, characters, terms, numbers, or the like. Furthermore, it may also be convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it may be appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects include process steps and instructions described herein in the form of an algorithm. It should be noted that the process steps and instructions can be embodied in software, firmware and/or hardware, and when embodied in software, can be downloaded to reside on and be operated from different platforms used by a variety of operating systems.

The present document also relates to an apparatus for performing the operations herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, DVD-ROMs, magnetic-optical disks, read-only memories (ROMs), random access memories (RAMs), EPROMs, EEPROMs, flash memory, solid state drives, magnetic or optical cards, application specific integrated circuits (ASICs), or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the system and method are not described with reference to any particular programming language. It will be appreciated that a variety of programming languages may be used to implement the teachings described herein, and any references above to specific languages are provided for disclosure of enablement and best mode.

Accordingly, various embodiments include software, hardware, and/or other elements for controlling a computer system, computing device, or other electronic device, or any combination or plurality thereof. Such an electronic device can include, for example, a processor, an input device (such as a keyboard, mouse, touchpad, track pad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or non-portable. Examples of electronic devices that may be used for implementing the described system and method include: a mobile phone, personal digital assistant, smartphone, kiosk, server computer, enterprise computing device, desktop computer, laptop computer, tablet computer, consumer electronic device, or the like. An electronic device may use any operating system such as, for example and without limitation: Linux; Microsoft Windows, available from Microsoft Corporation of Redmond, Washington; MacOS, available from Apple Inc. of Cupertino, California; iOS, available from Apple Inc. of Cupertino, California; Android, available from Google, Inc. of Mountain View, California; and/or any other operating system that may be adapted for use on the device.

While a limited number of embodiments have been described herein, those skilled in the art, having benefit of the above description, will appreciate that other embodiments may be devised. In addition, it should be noted that the language used in the specification has been principally selected for readability and instructional purposes, and may not have been selected to delineate or circumscribe the subject matter. Accordingly, the disclosure is intended to be illustrative, but not limiting, of scope.

What is claimed is:

1. A computer-implemented method for extracting information from a document, comprising:
    at a hardware processing device, receiving a document;
    at the hardware processing device, automatically extracting image data from the received document;
    at the hardware processing device, automatically determining a source of the received document;
    at the hardware processing device, automatically determining whether a template exists for the determined source in a data storage device;
    responsive to a template not existing for the determined source:

at the hardware processing device, automatically extracting information from the image data representing the received document;
        based on the extracted information, at the hardware processing device, automatically creating a template for the determined source; and
        storing the created template in the data storage device;
    responsive to a template existing for the determined source, automatically retrieving the template from the data storage device;
    based on the template for the determined source, at the hardware processing device, automatically extracting information from the image data representing the received document;
    at the hardware processing device, receiving feedback from at least one user specifying data expected to be found within the received document;
    at the hardware processing device, automatically assigning a confidence metric to the received feedback;
    at the hardware processing device, automatically identifying at least a subset of the feedback as having a confidence metric indicating that the subset is trustworthy;
    at the hardware processing device, comparing the identified subset of the received feedback with the extracted information;
    at the hardware processing device, automatically refining the template based on the results of the comparison; and
    outputting the extracted information on an output device.

2. The method of claim 1, wherein:
    comparing the identified subset of the received feedback with the extracted information comprises identifying at least one error in the extracted information; and
    automatically refining the template comprises automatically updating the template based on the indicated at least one error.

3. The method of claim 2, wherein:
    identifying at least one error in the extracted information comprises automatically determining at least one location in the received document corresponding to the at least one error; and
    automatically updating the template comprises automatically updating at least one portion of the template corresponding to the determined at least one location.

4. The method of claim 3, wherein the received user feedback is text-based, and wherein automatically determining at least one location in the received document corresponding to the indicated at least one error comprises:
    automatically scanning the received document to identify at least one location corresponding to the received text-based feedback.

5. The method of claim 1, wherein the received user feedback is text-based.

6. The method of claim 1, further comprising, prior to outputting the extracted information, validating the extracted information to determine a confidence metric for the extracted information.

7. The method of claim 1, wherein:
    the document comprises an invoice; and
    the source of the document comprises a vendor.

8. The method of claim 1, further comprising automatically populating an accounting record using the extracted information.

9. The method of claim 1, wherein receiving a document comprises receiving a visual representation of a scanned document.

10. A non-transitory computer-readable medium for extracting information from a document, comprising instructions stored thereon, that when performed by a hardware processor, perform the steps of:

receiving a document;

automatically extracting image data from the received document;

automatically determining a source of the document;

automatically determining whether a template exists for the determined source in a data storage device;

responsive to a template not existing for the determined source:

automatically extracting information from the image data representing the received document;

based on the extracted information, automatically creating a template for the determined source; and causing the created template to be stored in the data storage device;

responsive to a template existing for the determined source, automatically retrieving the template from the data storage device;

based on the template for the determined source, automatically extracting information from the image data representing the received document;

receiving feedback from at least one user specifying data expected to be found within the received document;

automatically assigning a confidence metric to the received feedback;

automatically identifying at least a subset of the feedback as having a confidence metric indicating that the subset is trustworthy;

comparing the identified subset of the received feedback with the extracted information;

automatically refining the template based on the results of the comparison; and causing the extracted information to be output on an output device.

11. The non-transitory computer-readable medium of claim 10, wherein:

comparing the identified subset of the received feedback with the extracted information comprises identifying at least one error in the extracted information; and automatically refining the template comprises automatically updating the template based on the indicated at least one error.

12. The non-transitory computer-readable medium of claim 11, wherein:

identifying at least one error in the extracted information comprises automatically determining at least one location in the received document corresponding to the indicated at least one error; and automatically updating the template comprises automatically updating at least one portion of the template corresponding to the determined at least one location.

13. The non-transitory computer-readable medium of claim 12, wherein the received user feedback is text-based, and wherein automatically determining at least one location in the received document corresponding to the indicated at least one error comprises:

automatically scanning the received document to identify at least one location corresponding to the received text-based feedback.

14. The non-transitory computer-readable medium of claim 10, wherein the received user feedback is text-based.

15. The non-transitory computer-readable medium of claim 10, further comprising instructions stored thereon, that when performed by a hardware processor, perform the step of, prior to causing the extracted information to be output on an output device, validating the extracted information to determine a confidence metric for the extracted information.

16. The non-transitory computer-readable medium of claim 10, wherein:

the document comprises an invoice; and the source of the document comprises a vendor.

17. The non-transitory computer-readable medium of claim 10, further comprising instructions stored thereon, that when performed by a hardware processor, perform the step of automatically populating an accounting record using the extracted information.

18. The non-transitory computer-readable medium of claim 10, wherein receiving a document comprises receiving a visual representation of a scanned document.

19. A system for extracting information from a document, comprising:

a data storage device;

an output device;

a hardware processing device, communicatively coupled to the data storage device and the output device, configured to:

receive a document;

automatically extract image data from the received document;

automatically determine a source of the document;

automatically determine whether a template exists for the determined source in the data storage device;

responsive to a template not existing for the determined source:

automatically extract information from the image data representing the received document;

based on the extracted information, automatically create a template for the determined source; and cause the created template to be stored in the data storage device;

responsive to a template existing for the determined source, automatically retrieve the template from the data storage device; and based on the template for the determined source, automatically extract information from the image data representing the received document;

and an input device, communicatively coupled to the hardware processing device, configured to receive feedback from at least one user specifying data expected to be found within the received document;

automatically assign a confidence metric to the received feedback;

wherein:

the hardware processing device is further configured to:

automatically identify at least a subset of the feedback as having a confidence metric indicating that the subset is trustworthy;

compare the identified subset of the received feedback with the extracted information; and automatically refine the template based on the results of the comparison; and the output device is configured to output the extracted information.

20. The system of claim 19, wherein:

comparing the identified subset of the received feedback with the extracted information comprises identifying at least one error in the extracted information; and automatically refining the template comprises automatically updating the template based on the indicated at least one error.

21. The system of claim 20, wherein:

identifying at least one error in the extracted information comprises automatically determining at least one location in the received document corresponding to the at least one error; and automatically updating the template comprises automatically updating at least one portion of the template corresponding to the determined at least one location.

22. The system of claim 21, wherein the received user feedback is text-based, and wherein automatically determining at least one location in the received document corresponding to the indicated at least one error comprises:

automatically scanning the received document to identify at least one location corresponding to the received text-based feedback.

23. The system of claim 19, wherein the received user feedback is text-based.

24. The system of claim 19, wherein the hardware processing device is further configured to, prior to the output device outputting the extracted information, validate the extracted information to determine a confidence metric for the extracted information.

25. The system of claim 19, wherein:

the document comprises an invoice; and the source of the document comprises a vendor.

26. The system of claim 19, wherein the hardware processing device is further configured to automatically populate an accounting record using the extracted information.

27. The system of claim 19, wherein receiving a document comprises receiving a visual representation of a scanned document.

* * * * *